United States Patent [19]
Settlemyer

[11] 3,766,660
[45] Oct. 23, 1973

[54] ADSORPTION GAS DRYING METHOD AND APPARATUS

[75] Inventor: Bernard W. Settlemyer, Coraopolis, Pa.

[73] Assignee: Ajax Magnethermic Corporation, Warren, Ohio

[22] Filed: Aug. 16, 1972

[21] Appl. No.: 281,032

[52] U.S. Cl. .................................. 34/9, 34/80
[51] Int. Cl. ....................... F26b 3/00, F26b 5/16
[58] Field of Search ....................... 34/9, 80, 81

[56] References Cited
UNITED STATES PATENTS
2,373,100  4/1945  Chapman .................................. 34/9
2,330,655  9/1943  Zucker ..................................... 34/80
3,436,839  4/1969  Ellington ................................. 34/80

Primary Examiner—John J. Camby
Attorney—J. H. Slough

[57] ABSTRACT

A continuous gas drying method and apparatus is disclosed in which only a single primary adsorbent bed is used and in which secondary, smaller adsorbent bed is used to adsorb moisture from gas while the primary bed is being reactivated. While the primary bed is adsorbing moisture, the dry gas from the primary bed is utilized to reactivate the secondary bed. The gas flow is continuously through the primary adsorbent bed in a single direction only with the flow of dry air produced being reduced or the moisture level being somewhat higher during the reactivating period of the secondary adsorbent bed.

9 Claims, 3 Drawing Figures

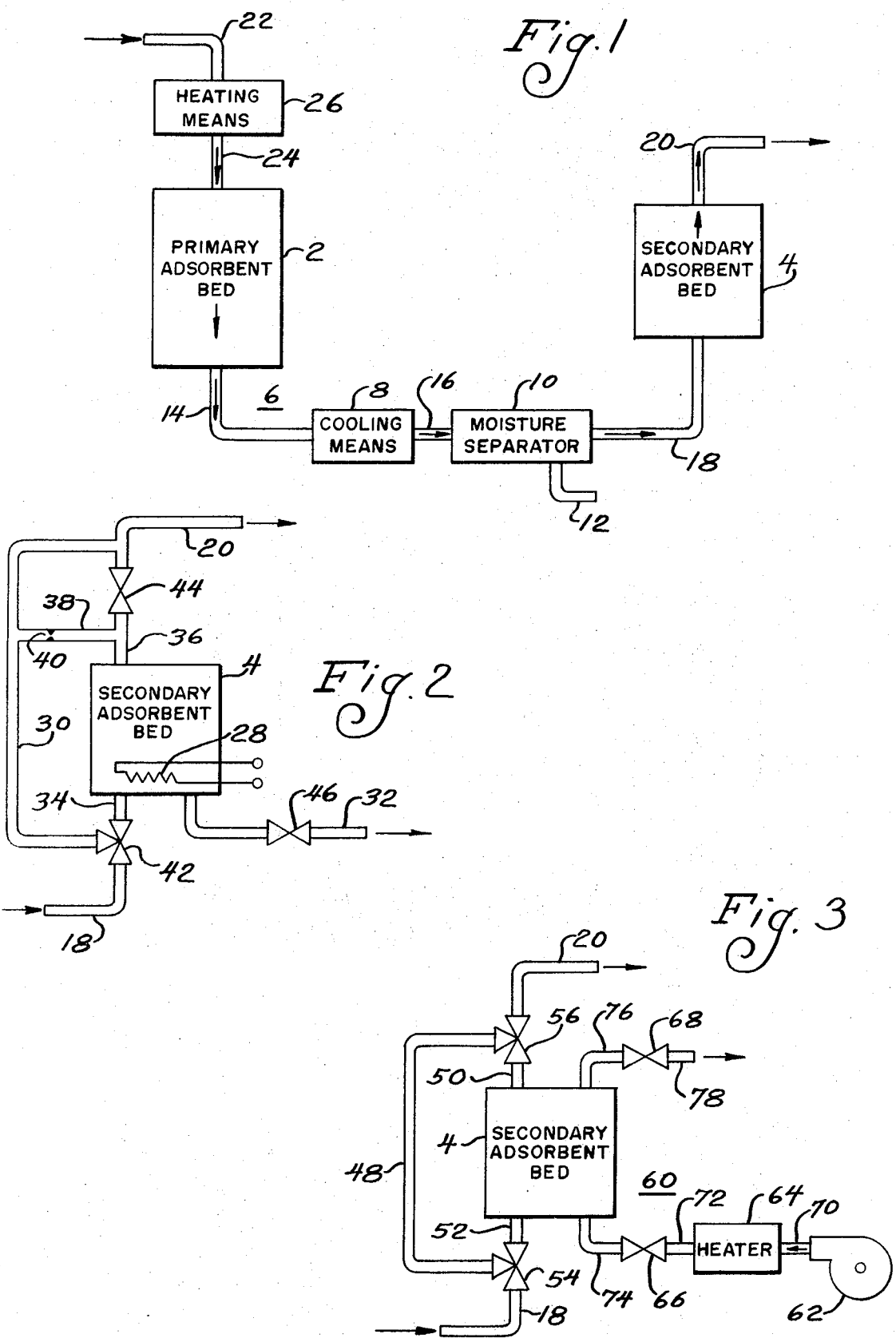

3,766,660

ADSORPTION GAS DRYING METHOD AND APPARATUS

BACKGROUND OF THE INVENTION

This invention relates to a gas drying method and apparatus and, more particularly, to a method and apparatus for removing moisture from an air stream.

Apparatus for the drying or purifying of gas by the general method of contacting it with an adsorbent material or desiccant, such as activated alumina, is well known. In systems of this type, the gas to be treated is passed for a period of time through a bed of adsorbent material until it becomes substantially saturated with moisture or other impurities. At this point, removal of moisture and impurities by the adsorbent bed is stopped and the bed is reactivated. Reactivation is accomplished by flowing heated gas, which has a dew point lower than its heated temperature, through the adsorbent bed so that the adsorbed impurities and moisture are evaporated and carried away by the heated reactivating gas. The moisture laden reactivating gas is then cooled and passed through moisture eliminating apparatus. In many cases, continuous operation and producing of dry gas is desired. In this event, a pair of adsorbent beds each within its own chamber or tower is utilized so that one of the beds is drying gas while the other bed is being reactivated.

Another type of prior art gas drying system utilizing a desiccant adsorptive material is one in which the primary gas drying apparatus is a refrigerating system. In this type of apparatus, the moist gas to be dried is flowed through a heat exchange chamber which cools the gas to the point where moisture condenses and freezes out of the gas. The frozen moisture accumulates on the cooling coils of the heat exchanger so that the cooling and condensing cycle must be interrupted periodically to remove the frozen moisture from the coils. During this defrosting, an auxiliary or secondary bed of desiccant adsorbent material may be used to dry the gas so that continuous gas drying can be provided.

There are undesirable aspects in both of the above described gas drying systems. Due to the requirement of two full sized desiccant adsorbent beds in the dual bed adsorbent system, the cost of the system is quite high. In the refrigerating gas drying system, the amount of moisture that can be removed from the gas is less than that of the desiccant adsorbent system. Therefore, the refrigerating drying system cannot be used where relatively low ambient temperatures are encountered by the "dry" gas produced.

SUMMARY OF THE INVENTION

It is a general object of the invention to provide a continuous gas drying system of the desiccant or adsorbent material type in which only a single full size primary adsorbent bed is required.

A more specific object of the invention is to provide a continuous gas drying system of the desiccant or adsorbent material type utlizing only a single full size primary adsorbent and a relatively small secondary adsorbent bed for drying or assisting in drying gas while the primary adsorbent bed is being reactivated.

The objects of the invention are accomplished by providing a single primary adsorbent bed, a secondary retatively small adsorbent bed, flowing gas serially through the primary adsorbent bed and then through and out of the secondary adsorbent bed, providing a heating means in the air flow upstream of the primary adsorbent bed and a cooling means and moisture separating means in the air flow between the primary and secondary adsorbent beds. The cooling means and moisture separating means are inoperative during the drying condition of the primary adsorbent bed. The heating means is also inoperative during the drying condition of the primary adsorbent bed so that the temperature of the moist gas is at a temperature such that the primary adsorbent bed adsorbs moisture from the gas to thereby dry it. The dry gas flows through the secondary adsorbent bed and, because of its dry condition, removes moisture from the secondary adsorbent bed to reactivate it. The secondary adsorbent bed is thus in a reactivating condition during the adsorbing condition of the primary bed. When the primary adsorbent bed becomes relatively saturated with moisture, the heating means, cooling means and moisture separating means become operative. The moist gas flowing through the heating means is raised to a temperature above its dew point and this moist, relatively hot gas carries the moisture out of the primary adsorbent bed to reactivate it. The hot, moist gas flowing from the primary bed is cooled by the cooling means to thereby condense the moisture from the gas and the moisture separating means removes and drains away the moisture. As the cooled gas passes through the secondary adsorbent bed, further moisture is removed from it to provide dry gas while the primary bed is being reactivated. During this period of operation, the secondary bed is in an adsorbing condition and the primary bed is in a reactivating condition. At the end of the reactivating condition of the primary bed, the heating means, cooling means and moisture separating means again become inoperative and the primary bed again adsorbs moisture from the gas while the secondary bed is being reactivated. This entire cycle is continuously repeated to meet the objectives of the invention.

BRIEF DESCRIPTION OF THE DRAWING

FIG. 1 schematically illustrates a gas drying system according to the instant invention;

FIG. 2 shows another embodiment of the gas drying system; and

FIG. 3 shows a third embodiment of the gas drying system.

DESCRIPTION OF THE PREFERRED EMBODIMENT

Referring to FIG. 1 of the drawing, a gas drying apparatus is shown as having a primary adsorbent 2, a secondary adsorbent bed 4 and passage or conduit means 6 providing a flow path between the primary adsorbent bed 2 and the secondary adsorbent bed 4. A cooling means 8 and moisture separator 10 having a moisture drain 10 are connected to the conduit means 6 betweeen the primary bed 2 and secondary bed 4. The conduit means 8 includes conduit 14 connecting the primary bed 2 and cooling means 8, a conduit 16 connecting the cooling means 8 and moisture separator 10 and a conduit 18 connecting the moisture separator 10 and secondary bed 4. A conduit 20 exhausts gas from the secondary bed 4 to the system (now shown) requiring the dry gas. Conduits 22 and 24 are provided for admitting gas to the primary adsorbent bed 2. Heating means 26 is connected to the conduits 22 and 24 for heating moist gas flowing to the primary bed 2. The moist gas is admitted into conduit 22 and flows through the system in the direction of the arrows shown in FIG. 1.

During operation of the gas drying system, moist gas is continually admitted into conduit 22 and dry gas is continuously exhausted from conduit 20. The primary adsorbent bed 2 and the secondary adsorbent bed 4 each have a drying or gas adsorbing condition and a reactivating condition. The adsorbing condition of the primary bed 2 occurs when the secondary bed is in its moisture adsorbing condition. The primary bed 2 and secondary bed 4 each contain a moisture adsorbing material or desiccant such as activated alumina through which gas is flowed. While the primary bed 2 is in its moisture adsorbing condition and is removing moisture from the gas, the heating means 26, cooling means 8 and moisture separator 10 are all inoperative. The gas flowing to the primary bed 2 during its moisture adsorbing condition may be maintained at a temperature permitting removal of its moisture by bed 2 if necessary. The dry gas flowing from the primary bed 2 has a sufficiently low dew point that it will remove moisture from the secondary bed 4 as it flows through the latter and out of conduit 20. The size of the primary bed 2 and the rate of flow of gas through it is such that the gas flowing from the bed 2 is dryer than required in the system receiving the dry gas. Thus, the dry gas from primary bed 2 can pick up additional moisture from secondary bed 4 and still satisfy the maximum moisture content of the air required in the system receiving the gas. Thus, the secondary bed 4 is reactivated while gas is being dried by the primary bed 2.

When the primary bed 2 becomes saturated to the extent that it no longer can adsorb sufficient moisture to meet the moisture level requirements of the system receiving the gas, the heating means 26, cooling means 8 and moisture separator 10 become operative. The heating means 26 then heats the incoming moist gas above its dew point so that the heated gas causes evaporation of moisture from the primary bed 2 and the gas carries the evaporated moisture from the primary bed 2. The heated gas flowing in conduit 14 to the cooling means 8 is saturated so that cooling of the gas by cooling means 8 causes condensation of moisture from the gas. A moisture separator 10 then removes the condensed moisture from the system through the drain 12. After leaving the cooling means 8 and moisture separator 10, the gas is saturated with moisture to the degree of the temperature of cooling by the cooling means 8. The cooled gas flows through the conduit 18 and through the secondary bed 4 where sufficient additional moisture is adsorbed from the gas that the gas exhausting through conduit 20 has a moisture content which meets the requirements of the system receiving the gas.

In the alternative embodiment of the invention shown in FIG. 2, elements indentical to those shown in the embodiment of FIG. 1 are indentified by the same numerals. The conduit 18 receives the gas flowing through the primary adsorbent bed 2, the cooling means 8 and the moisture separator 10. The conduit 20 exhausts gas to the system utilizing it. The embodiment of FIG. 2 also includes a by-pass conduit 30, a purge conduit outlet 32, a gas inlet conduit 34, an outlet conduit 36, and a reactivating conduit 38. A restriction 40 is located in the conduit 38. A three-way valve 42 connects the conduits 18, 30 and 34, and two-way valves 44 and 46 are positioned in the conduits 20 and 32.

When the primary adsorbent bed 2 is in moisture adsorbing condition, the valve 42 connects conduit 18 and by-pass conduit 30 so that dry air flows through by-pass conduit 30 and out of conduit 20. At this time, valve 44 is closed. A part of the dry air flowing through by-pass conduit 30 flows through the restriction 40, conduit 38, conduit 36 and through the secondary bed 4. The valve 46 is open so that this gas will flow out of the purge conduit outlet 32. The dry gas flowing through the secondary bed 4 reactivates it in the same manner as the bed 4 is reactivated in the embodiment of FIG. 1. However, due to the restriction 40 a smaller volume of dry gas passes through the secondary bed 4 so that its reactivation takes longer but is still within the time required for the prmary bed 2 to saturate. A heater 28 may be also provided to operate during the reactivating condition of the secondary bed 4 to evaporate moisture which is then carried away by the dry gas to thereby increase the rate of reactivation of the secondary bed 4. The heater 28 may be of any suitable type and, as shown in FIG. 2, is an electrical heater connected to a source of electrical energy (not shown). During the reactivating condition of the primary bed 2, the valve 42 connects the conduits 18 and 34, the valve 44 is open and the valve 46 is closed. The heater 28 is inoperative. The secondary bed 4 receives cool gas from the cooling means 8 and moisture separator 10 and is in its moisture adsorbing condition in which it removes moisture from the gas prior to its exhausting through conduit 20. This mode of operation of secondary bed 4 is the same as that of secondary bed 4 in the embodiment of FIG. 1. The advantage of this embodiment of the invention is that a drier gas is provided during the reactivating condition of the secondary adsorbent bed 4.

In the embodiment of FIG. 3, elements which are indentical to those shown in the embodiment of FIG. 1 are also identified by the same numeral. These elements are conduit 18, conduit 20 and secondary adsorbent bed 4. The embodiment of FIG. 3 also includes a by-pass conduit 48, conduits 50 and 52, a three-way valve 54 and a three-way valve 56. Reactivating means 60 includes a blower 62, a heater 64 and valves 66 and 68. Conduits 70, 72, 74, 76 and 78 connect these elements and the secondary adsorbent bed 4 together. During the moisture adsorbing condition of the primary bed 2, the secondary bed 4 is reactivated by the reactivating means 60. This is accomplished by the blower 62 blowing atmospheric air through the heater 64 which raises the temperature of the air above its inlet dew point. The valves 66 and 68 are open so that the heated air from the heater 64 flows through the secondary bed 4 to evaporate the moisture therein and carry the moisture from the bed 4 out through the conduit 78. While the primary bed 2 is in its reactivating condition, the valve 54 connects the conduit 18 and conduit 52 and the valve 56 connects conduits 50 and 20. The reactivating means 60 is inoperative and the valves 66 and 68 are closed. The cool air from the cooling means 8 and moisture separator 10 flows through the secondary bed 4 in which moisture is adsorbed from the gas. The advantage of this embodiment of the invention is that moisture from the secondary bed 4 is not added to the main stream of dried gas. Thus the primary adsorbent bed may either be smaller or a higher rate of flow of dry gas may be supplied.

It can thus be seen that the method and apparatus according to the instant invention provides a continuous supply of dry gas while utilizing only one primary adsorbent bed. Although the rate of flow of dry gas to the system using the gas may be decreased during reactivating of the secondary adsorbent bed, this decrease in flow occurs for a relatively short time which can be tolerated by many systems requiring dry air. Accordingly, the drying apparatus of the invention provides a considerable economic advantage over other types of drying apparatus in such systems using dried gas.

While only three specific embodiments of the invention have been shown herein, it will be realized that many modifications thereof are feasible without departing from the spirit and scope of the invention. It is accordingly intended that the scope of the invention is not to be limited to the specific embodiments disclosed.

I claim:

1. In an apparatus for continuously drying gas flowing therethrough, the combination comprising a single primary adsorbent bed including a desiccant material and receiving moist gas, a secondary adsorbent bed including a desiccant material and exhausting relatively dry gas, said primary and secondary adsorbent beds each having a moisture adsorbing condition and a regenerating condition, passage means connecting said primary and secondary adsorbent beds for carrying said gas from the primary to the secondary bed, the moisture adsorbing condition of the primary adsorbent bed and the regenerating condition of the secondary adsorbent bed occurring simultaneously, the dry gas from the primary adsorbent bed flowing through and removing moisture from the secondary adsorbent bed during the moisture adsorbing condition of the former whereby the latter is regenerated, means for heating said moist gas received by the primary adsorbent bed during the regenerating condition of the latter the heated moist gas removing moisture from the primary adsorbent bed whereby the latter is regenerated, and the moisture adsorbing condition of the secondary adsorbent bed and the regenerating condition of the primary adsorbent bed occur simultaneously whereby moisture in the gas from the primary adsorbent bed is adsorbed by the secondary adsorbent bed.

2. The combination according to claim 1 further comprising cooling and moisture removing means connected to said passage means intermediate the primary and secondary adsorbent beds and being operative only during the regenerating condition of the primary adsorbent bed to condense and remove part of the moisture from the heated moist gas.

3. The combination according to claim 2 wherein said secondary adsorbent bed is smaller than the primary adsorbent bed.

4. The combination according to claim 2 wherein said passage means includes means for by-passing a part of the dry gas from the primary adsorbent bed around the secondary adsorbent bed during the regenerating condition of the secondary adsorbent bed.

5. The combination according to claim 4 further comprising means for heating the secondary adsorbent bed and evaporating moisture therein during the regenerating condition of the latter to assist in regenerating the secondary adsorbent bed.

6. In a method of drying gas continuously in a gas drying system having a heater, a primary adsorbent bed, a cooler and a secondary adsorbent bed, the steps comprising: continuously flowing moist gas through said primary adsorbent bed, maintaining the moist gas at a temperature such that the primary adsorbent bed adsorbs moisture from the gas to dry it, flowing the dry gas through said secondary adsorbent bed to remove moisture from and regenerate the latter, when the primary adsorbent bed becomes saturated heating the moist gas prior to flowing it through the primary adsorbent bed, cooling the moist gas flowing from the primary adsorbent bed while said moist gas is being heated to condense a part of the moisture from the moist gas, flowing the cooled gas through the secondary adsorbent bed to remove additional moisture from the gas and, when the primary adsorbent bed is regenerated, repeating the aforegoing steps.

7. The method of claim 6 further comprising the step of by-passing a part of the dry gas from the primary adsorbent bed around the secondary adsorbent bed during regeneration of the latter.

8. The method of claim 7 further comprising the step of heating the secondary adsorbent bed while flowing dry gas through the secondary adsorbent bed to increase the rate of regeneration of the latter.

9. In a method of drying gas continuously in a gas drying system having a heater, a primary adsorbent bed, a cooler and a secondary adsorbent bed, the steps comprising, continuously flowing moist gas through said primary adsorbent bed, maintaining the moist gas at a temperature such that the primary adsorbent bed adsorbs moisture from the gas to dry it, flowing heated air through the secondary adsorbent bed to regenerate the latter only while the primary adsorbent bed is drying moist gas, when the primary adsorbent bed becomes saturated heating the moist gas prior to flowing it through the primary adsorbent bed to remove moisture from and regenerate the primary adsorbent bed, cooling the moist gas flowing from the primary adsorbent bed while said moist gas is being heated to condense a part of the moisture from the moist gas, flowing the cooled gas through the secondary adsorbent bed to remove additional moisture from the gas and, when the primary adsorbent bed is regenerated, repeating the aforegoing steps.

* * * * *

UNITED STATES PATENT OFFICE
CERTIFICATE OF CORRECTION

Patent No. 3,766,660      Dated October 23, 1973

Inventor(s) Bernard W. Settlemyer

It is certified that error appears in the above-identified patent and that said Letters Patent are hereby corrected as shown below:

Column 2, line 64 "(now shown)" should be ---not shown---.

Column 6, line 6, (in claim 5) after "therein" and before "during" insert the word ---only---.

Column 6, line 20, (in claim 6) after the word "bed," omit the comma (,) and between said "bed" and the word "cooling" insert the following phrase ---to remove moisture from and regenerate the primary adsorbent bed,---.

Signed and sealed this 8th day of October 1974.

(SEAL)
Attest:

McCOY M. GIBSON JR.
Attesting Officer

C. MARSHALL DANN
Commissioner of Patents